United States Patent [19]
Diekelman et al.

[11] Patent Number: 6,007,027
[45] Date of Patent: Dec. 28, 1999

[54] METHOD AND APPARATUS FOR EARLY SERVICE USING PHASED SATELLITE DEPOLYMENT

[75] Inventors: Dennis Paul Diekelman, Tempe; George Thomas Kroncke, Gilbert; Keith Andrew Olds, Mesa, all of Ariz.

[73] Assignee: Motorola, Inc., Schaumburg, Ill.

[21] Appl. No.: 08/970,670

[22] Filed: Nov. 14, 1997

[51] Int. Cl.⁶ .................................................. B64G 1/10
[52] U.S. Cl. ...................... 244/158 R; 455/12.1; 455/13.2; 342/350; 342/352; 342/354; 342/368
[58] Field of Search ............ 244/158 R; 455/12.1, 455/13.3, 25, 429, 13.2; 342/354, 350, 352, 368; 343/DIG. 2; 701/13; 340/825.44; 370/310, 316, 328

[56] References Cited

U.S. PATENT DOCUMENTS

| | | | |
|---|---|---|---|
| 5,017,925 | 5/1991 | Bertiger et al. | 342/352 |
| 5,121,503 | 6/1992 | Davis | 455/12.1 |
| 5,410,731 | 4/1995 | Rouffet et al. | 455/13.1 |
| 5,433,726 | 7/1995 | Horstein et al. | 244/158 R |
| 5,439,190 | 8/1995 | Horstein et al. | 244/158 R |
| 5,551,624 | 9/1996 | Horstein et al. | 244/158 R |
| 5,641,134 | 6/1997 | Vatt | 244/158 R |
| 5,642,122 | 6/1997 | Lockie et al. | 343/881 |
| 5,642,358 | 6/1997 | Dent | 370/323 |
| 5,736,959 | 4/1998 | Patterson et al. | 342/354 |
| 5,784,695 | 7/1998 | Upton et al. | 455/442 |
| 5,790,070 | 8/1998 | Natarajan et al. | 342/354 |
| 5,810,297 | 9/1998 | Basuthakur et al. | 244/176 |
| 5,813,634 | 9/1998 | Pizzicaroli et al. | 244/176 |

OTHER PUBLICATIONS

Definition for "propose," Webster's New Riverside University Dictionary, 1994.

*Primary Examiner*—William A. Cuchlinski, Jr.
*Assistant Examiner*—Yonel Beaulieu
*Attorney, Agent, or Firm*—Jennifer B. Wuamett

[57] ABSTRACT

A method (100) for providing continuous communication service from a partially populated satellite constellation includes deploying one or more phases of satellites to populate one or more sets of orbital planes (210), and providing continuous communication service from the one or more sets of orbital planes. Satellites (320) in each phase of satellites can be positioned to reside substantially the same as a position in which they will reside in a fully populated satellite constellation thereby eliminating the need to relocate satellites in the fully populated satellite constellation. Also, a communication unit (600) and a method (700) for the communication unit to communicate in a satellite communication system having a satellite constellation capable of being deployed in a plurality of phases is provided. The communication unit is capable of communicating with the satellite communication system at various minimum elevation angles during various phases of deployment. Additionally, an antenna apparatus (800) adapted for providing satellite service at various minimum elevation angles during various phases of deployment also is provided.

32 Claims, 6 Drawing Sheets

*FIG. 8*

METHOD AND APPARATUS FOR EARLY SERVICE USING PHASED SATELLITE DEPOLYMENT

FIELD OF THE INVENTION

This invention relates generally to the field of satellite services. More specifically, this invention relates to a method and apparatus for providing early service from a satellite system using phased satellite deployment.

BACKGROUND OF THE INVENTION

Within the past decade, the telecommunication industry has seen a marked increase in demand not only for globally interconnected telephone services but also for global interconnection for broadband services. In recent years, the industry has seen the first serious consideration of Nongeostationary Orbit (NGSO) satellite constellations using Low Earth Orbit (LEO) and/or Medium Earth Orbit (MEO) satellites and/or some combination of LEO, MEO, and/or Geostationary Earth Orbit (GEO) satellites to respond to the rapidly expanding demand for global telecommunication services. These proposed satellite communication systems have the potential to provide world-wide and/or regional coverage at a much lower cost than would be possible using a terrestrial fiber-optic network. Such proposed satellite communication systems also have the potential for providing economical services to virtually any point on the earth, even to remote or sparsely populated areas where it may not be economically feasible to deploy a terrestrial network, through satellite-tosatellite and satellite-to-ground links.

In addition to the various satellite communication systems proposed for use in the telecommunication industry, satellites systems have been proposed for numerous other uses as well, including for example, remote sensing, resource mapping, sale of information from space, and navigation (or global positioning).

Of various satellite systems that have been proposed, some propose to provide world-wide coverage, while others propose to provide regional coverage, or coverage within a particular latitude band. Among these proposed satellite systems, use of satellite constellations designed with both polar and inclined orbits have been proposed.

Such proposed satellite systems generally include large satellite constellations made up of numerous satellites and possibly even as many as several hundred satellites. Manufacturing all of the satellites needed to populate relatively large satellite constellations and launching and deploying all of these satellites into their proper orbital positions to provide a fully populated satellite constellation generally requires a very large capital expenditure and is a very lengthy process. For example, providing a fully populated, fully operational satellite even of less than 100 satellites could require capital expenditure in the billions of dollars and could take years to complete.

In prior art GEO satellite systems, the satellite system operator generally can provide service and begin collecting revenues from providing service to a first market area after deploying as few as one satellite. This is because by nature of their orbit, GEO satellites can provide continuous visibility in a relatively large coverage area with only one GEO satellite. Revenues generated with this first satellite can then be used to provide funding to manufacture, launch and deploy additional GEO satellites to additional market areas.

The dynamics of NGSO satellite systems do not readily allow for derivation of revenues after launching and deploying a single satellite or even several satellites, as providing continuous service from such as system would not be feasible. One option for deriving early revenue, or deriving revenue at a point in time that is earlier than the time when the constellation is expected to be fully populated, would be to employ a rapid deployment campaign. A rapid deployment campaign involves populating the constellation by placing the entire constellation in space via multiple satellite launches where multiple satellites are launched per launch vehicle within a very short time period. This option, however, is very costly and very time and resource intensive.

A phased deployment option for a MEO satellite communication system to provide service in a portion of a potential subscriber population is described in U.S. Pat. No. 5,439,190, to Hornstein et al. The system described in this patent and other similar prior art systems employ a phased deployment option where an "original system" which utilizes a "minimum number of satellites" to "reduce the initial capital investment" in an initial phase of deployment. This option requires partially populating each orbit of the proposed constellation with at least one satellite to provide service in a portion of the potential subscriber population. This option also requires that the satellites deployed in the "original" phase be relocated or moved in space during later phases of deployment and certainly before the "fill satellite constellation" is provided. This need to relocate the satellites after they have been deployed is undesirable because it is very costly in terms of fuel requirements, may result in a requirement to adjust the attitude of one or more satellites in space, and almost inevitably results in disruption of service in the service regions where early service is being provided during the relocation process.

Thus what is needed is a method and apparatus for providing early service from a portion of a satellite constellation of a proposed satellite system to enable derivation of revenues before the satellite constellation is fully deployed and operational. What is further needed is a method and apparatus for providing such early service by populating the portion of the satellite constellation in a manner that will not require substantial relocation of the satellites after the satellites have been placed in orbit for providing the early service.

BRIEF DESCRIPTION OF THE DRAWINGS

The invention is pointed out with particularity in the appended claims. However, a more complete understanding of the present invention may be derived by referring to the detailed description and claims when considered in connection with the figures:

The exemplification set out herein illustrates a preferred embodiment of the invention in one form thereof, and such exemplification is not intended to be construed to be limiting in any manner.

DETAILED DESCRIPTION OF THE DRAWINGS

The present invention provides, among other things, a method for providing continuous service from a partially populated satellite constellation wherein the partially populated satellite constellation comprises a portion of a proposed fully populated satellite constellation which is in the process of being, but is not yet, fully populated. The proposed fully populated satellite constellation has a proposed number of total orbital planes, and each orbital plane will contain a proposed number of satellites. The method comprises deploying a first phase of satellites over a first period of time, populating a first set of orbital planes with the first phase of satellites, wherein the first set of orbital planes comprises less orbital planes than the proposed number of total orbital planes of the proposed fully populated satellite constellation, and providing continuous service to one or more devices, such as one or more communication units, within a first service region through the first phase of satellites. The method also can comprise deploying multiple phases of satellites to populate multiple sets of orbital planes over a period of time and providing continuous service through each phase of satellites of the multiple phases to a gradually increasing service region.

The first set of orbital planes can be populated with the first phase of satellites such that each orbital plane of the first set of orbital planes contains a number of satellites which is substantially the same as the proposed number of satellites for each orbital plane of the proposed fully populated satellite constellation. The first phase of satellites can be positioned in the set of orbital planes such that each satellite of a plurality of satellites residing in each orbital plane resides in a first position which is substantially the same as a position in which each satellite will reside in the fully populated satellite constellation; thus the plurality of satellites will not need to be relocated from the first position to a second position in the fully populated satellite constellation.

Also, a communication unit for communicating in a satellite communication system having a proposed fully populated satellite constellation capable of being deployed in a plurality of phases of deployment and capable of providing continuous communication services during one or more phases of the plurality of phases of deployment is provided. The communication unit is capable of communicating with the satellite communication system at various minimum elevation angles during various phases of deployment of satellites.

Additionally, a satellite adapted to provide service at various minimum elevation angles during various phases of deployment also is provided.

An advantage of the present invention is that it provides an improved method for minimizing initial capital expenditures and generating early revenue in a relatively large satellite system. Another advantage of the present invention is that it provides a cost effective method for providing continuous service through phased deployment of partially populated satellite constellations without the need to relocate satellites deployed in one or more early phases once the satellite constellation is filly populated.

The term "communication service" as used herein is intended to encompass any type of service provided by a satellite system or satellite constellation, including not only communication service between a satellite and a telecommunication-type device such as a telephone, but also between any other device capable of communicating with a satellite and/or with any other element of a satellite system.

The term "continuous service" is used herein to refer both to service, including, but not limited to, communication service, which is provided from a satellite constellation in a particular band of latitudes, as well as to service which is provided over certain periods of time, such as, for example wherein service would be available during a specific time of day at a specific geographic location, such as 12:00 p.m. to 1:00 p.m. or, for example during "business hours", and would be available continually during a specific time of day (and the availability in terms of hours per day could increase over time) continually once service is initiated from a satellite constellation.

A "satellite" is defined herein to mean a man-made object or vehicle intended to orbit a celestial body, such as the earth, and includes nongeostationary satellites, such as, for example, LEO and/or MEO satellites, or combinations of, LEO and/or MEO satellites and/or of other NGSOs. The terms "satellite constellation", "constellation" "partially populated satellite constellation" and "partial satellite constellation" are defined herein to mean an ensemble of satellites arranged in orbits for providing specified coverage (e.g., RF communication, photogrammetry, remote sensing, navigation, etc.) of portion(s) or all of the earth.

The term "proposed fully populated satellite constellation" refers to a satellite constellation which has a proposed final composition of a specified (although possibly tentative) number of orbital planes and a specified number of satellites proposed to reside in each orbital plane, but which constellation has not yet been fully deployed and will not be capable of providing continuous service at its potential maximum level of coverage (in terms of quality of service and/or bands of latitude to and/or periods of time in which service can be provided) for some period of time, possibly even for several years. In a preferred embodiment, satellites of a partial satellite constellation can communicate with other nearby satellites in the same orbital plane and possibly (although not necessarily) between satellites of different orbital planes through intersatellite links. While the present invention is advantageously employed when a large number of satellites are being used in a satellite constellation, it is also applicable with a relatively small constellation of, for example ten satellites (or a partial constellation comprised of one-half of the number of fully populated orbital planes expected to be included in a proposed fully populated satellite constellation of 20 satellites), and possibly with even fewer satellites.

The term "satellite system" is used herein to refer not only to satellite communication and/or telecommunication systems but to other types of satellite systems providing satellite-based services other than or in addition to telecommunication services, such as, for example, remote sensing, resource mapping, sale of information from space, and navigation (or global positioning).

The term "service region" as used herein could refer not only to a specific band of latitudes to which a satellite constellation is able to provide service, but could also refer to specific bands or blocks of time in which a satellite constellation is able to provide service.

Figure 1:
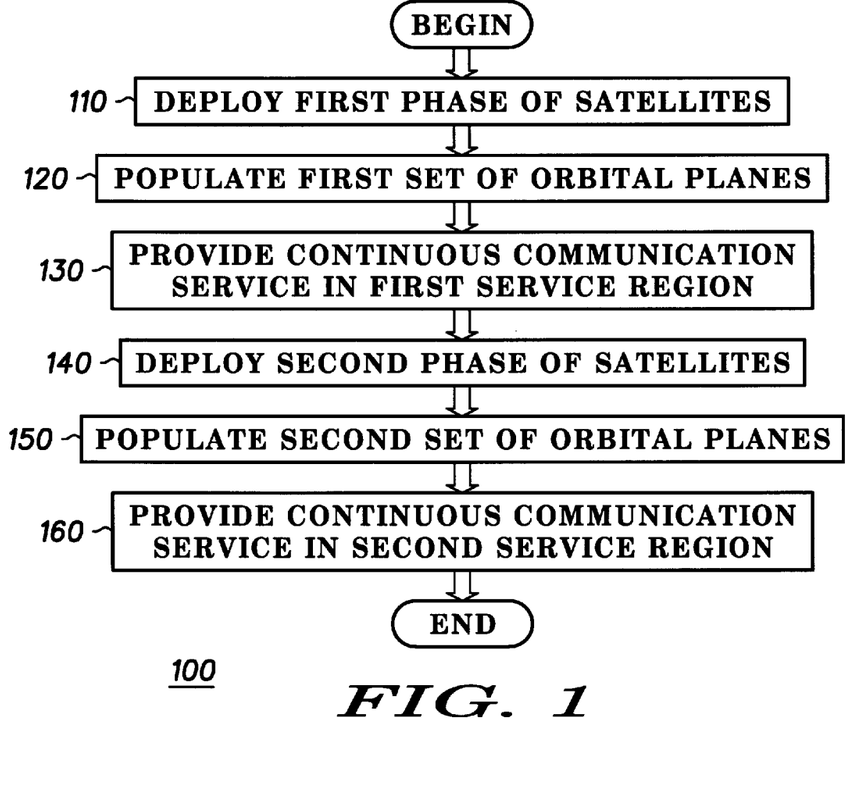
FIG. 1 illustrates a flow chart of a method for providing early service from a portion of a proposed satellite system in accordance with a preferred embodiment of the present invention.

FIG. 1 illustrates a flow chart of a method 100 for illustrates a flow chart of a method for providing early service from a portion of a proposed satellite system in accordance with a preferred embodiment of the present invention. Method 100 can be employed as part of a plan to deploy, over time, a proposed fully populated satellite constellation where a substantial amount of time, resources and financing will be involved in providing an operating, fully populated satellite constellation. Method 100 can be used to provide continuous service in a portion of a potential service area, the portion of the potential service area hereinafter being referred to as a "service region". Method 100 assumes that the proposed fully populated satellite constellation (once fully populated) will have a proposed number of total orbital planes, and that the orbital planes will have a relative plane phasing value which is consistent with a proposed optimal plane phasing value. Each orbital plane also will contain a proposed number of satellites.

Method 100 begins in step 110 with the step of deploying a first phase of satellites over a first period of time. The satellites could be deployed over an extended period of time which preferably is less than a period of time which it will take to deploy the proposed fully populated satellite constellation. Satellites can be deployed by launching the satellites into space by methods known to those of ordinary skill in the art.

Satellites deployed as part of the first phase of satellites can be used in step 120 for populating a first set of orbital planes with the first phase of satellites to form a partial satellite constellation (also referred to herein as a "partially populated satellite constellation). In step 120 the first set of orbital planes comprise fewer (or possibly the same number of ) orbital planes than the proposed number of total orbital planes of the proposed fully populated satellite constellation (also referred to herein as a "fully deployed satellite constellation"). For example, assume that a proposed fully populated satellite constellation is expected to have n orbital planes and that each orbital plane of the n orbital planes is expected to have m satellites residing therein (wherein m represents a number of satellites and n represents a number of orbital planes). In step 120, the first phase of satellites could comprise a plurality of satellites which will be used to populate x orbital planes, wherein x has a numeric value which is less than or equal to n. Additionally, each orbital plane of the x orbital planes populated by the first phase of satellites would be populated with m satellites, wherein m represents the same number of satellites as would reside in each plane of the fully deployed.

Additionally, the partial satellite constellation desirably would be deployed in a manner such that each satellite of the m satellites residing in each orbital plane of the partially satellite constellation will reside in a position in the partial satellite constellation which is substantially the same as a position in which the each satellite will reside in the fully deployed satellite constellation. This aspect of the present invention represents a substantial improvement over prior art phased deployment methods in that it eliminates the need to relocate individual satellites to different positions once the proposed fully populated satellite constellation has actually been fully deployed and populated. Relocating satellites after they have been placed in orbit requires significant expenditures in terms of fuel and system resources and also generally results in significant service disruption during the relocation process, thereby causing loss of revenue during the resulting disruption phase.

Moreover, in a preferred embodiment of the present invention, the orbital planes of the partial satellite constellation would be have a relative orbital plane phasing which is consistent with as the optimum plane phasing value of the proposed fully deployed constellation. In other words, the relative plane phasing of the partial satellite constellation populated with the first phase of satellites will be consistent with the plane phasing of the proposed fully populated satellite constellation, also referred to herein as the final constellation. This can be achieved by determining the optimal plane phasing value of the final constellation and adapting the plane phasing in the partial satellite constellation so that the are consistent with the optimal plane phasing value of the optimal plane phasing value of the final constellation. Thus, desirably the partial satellite constellation will have the same relative plane phasing value as the proposed fully deployed constellation even if the optimum plane phasing value of the partial satellite constellation would be different than the optimum phasing value of the proposed fully deployed constellation. Using the same relative plane phasing for the partial satellite constellation and the final constellation eliminates an undesirable possibility of needing to rephase the planes of the constellation which were populated as part of the partial satellite constellation.

In step 120, the planes could be populated using one or more early deployment strategies. For example, in one such early deployment strategy, one quarter of the total number of planes proposed to be included in the fully populated satellite constellation could be populated in a first phase of the phased deployment to provide early service from the partial satellite constellation. Thus, in the example described above where x was used to represent the number of orbital planes of the partial satellite constellation, x would have a numeric value approximately equal to one quarter of a numeric value of n, which represents the number of orbital planes of the proposed fully populated satellite constellation, and preferably, every fourth orbital plane of the proposed fully populated constellation will be fully populated in the partial satellite constellation. This early deployment strategy is a preferred strategy when the fully populated satellite constellation will be a relatively large constellation, potentially including dozens or even hundreds of satellites residing in numerous orbital planes.

An alternative early deployment strategy would be to populate one half of the total number of planes to be included in the fully populated satellite constellation in the first phase of deployment (e.g. x has a numeric value approximately equal to one half of a numeric value of n). This deployment strategy could comprise populating every other orbital plane in the partial satellite constellation or could comprise some other mode of populating half of the total number of planes without necessarily populating every other plane. These deployment strategies would be preferable when the fully populated satellite constellation will be a relatively small constellation.

The aforementioned early deployment strategies are readily applied when the proposed fully deployed satellite constellation is comprised of an even number of orbital planes. Yet another alternative early deployment strategy could be used when the proposed fully deployed satellite constellation has an odd number of orbital planes. For example, approximately every other orbital plane could be populated in a first phase to form the partial satellite constellation or using a similar deployment strategy.

In another alternative early deployment strategy, satellites could be deployed in several phases. For example, one quarter of the proposed orbital planes could be populated first and continuous service could be provided from the satellites residing in these orbital planes in a first service region during the first deployment phase, then a second phase of satellites could be deployed to populate a second set of orbital planes still desirably comprised of fewer orbital planes than the number of orbital planes to be populated in the proposed fully populated satellite constellation Population of the orbital planes could continue in this manner until the constellation has reached a composition of the proposed fully populated satellite constellation.

In an alternate embodiment of the present invention, either the first or second phase of satellites could be deployed to populate a set of first or second set of orbital planes which comprise the same number of orbital planes as the proposed number of total orbital planes of the proposed fully populated satellite constellation, but the satellites could be placed across the orbital planes in a manner such that each orbital planes contains a number of satellites which is fewer than the number of satellites to be included in each orbital plane of the fully deployed constellation. In this alternate embodiment, each satellite of the first or second phase preferably would be placed to reside in a position in the partial satellite constellation which is substantially the same as a position in which each satellite will reside in the fully deployed satellite constellation.

In step 130 of method 100, the partial satellite constellation can be used to provide continuous service to a service region. In a preferred embodiment of the present invention, the service region that will be serviced by the partial satellite constellation comprises a predetermined band of latitude corresponding to a geographic region of the earth which is a smaller geographic region than a geographic region expected to receive service from the proposed fully populated satellite constellation.

In an alternate embodiment, the service region could be one or more periods of time in which the partial satellite constellation is able to provide service in one or more geographic locations. For example, satellites placed in sun-synchronous orbits could be used to provide service to in one or more specified locations at a particular local time. In a first phase of deployment of the partial constellation, service could, for example, be provided for a few hours per day. The period of time during which service could be provided could then gradually increase during later phases of deployment of the partial satellite constellation until. For example, service could eventually be provided during local "business hours" and ultimately for full 24 hour periods.

Figure 2:
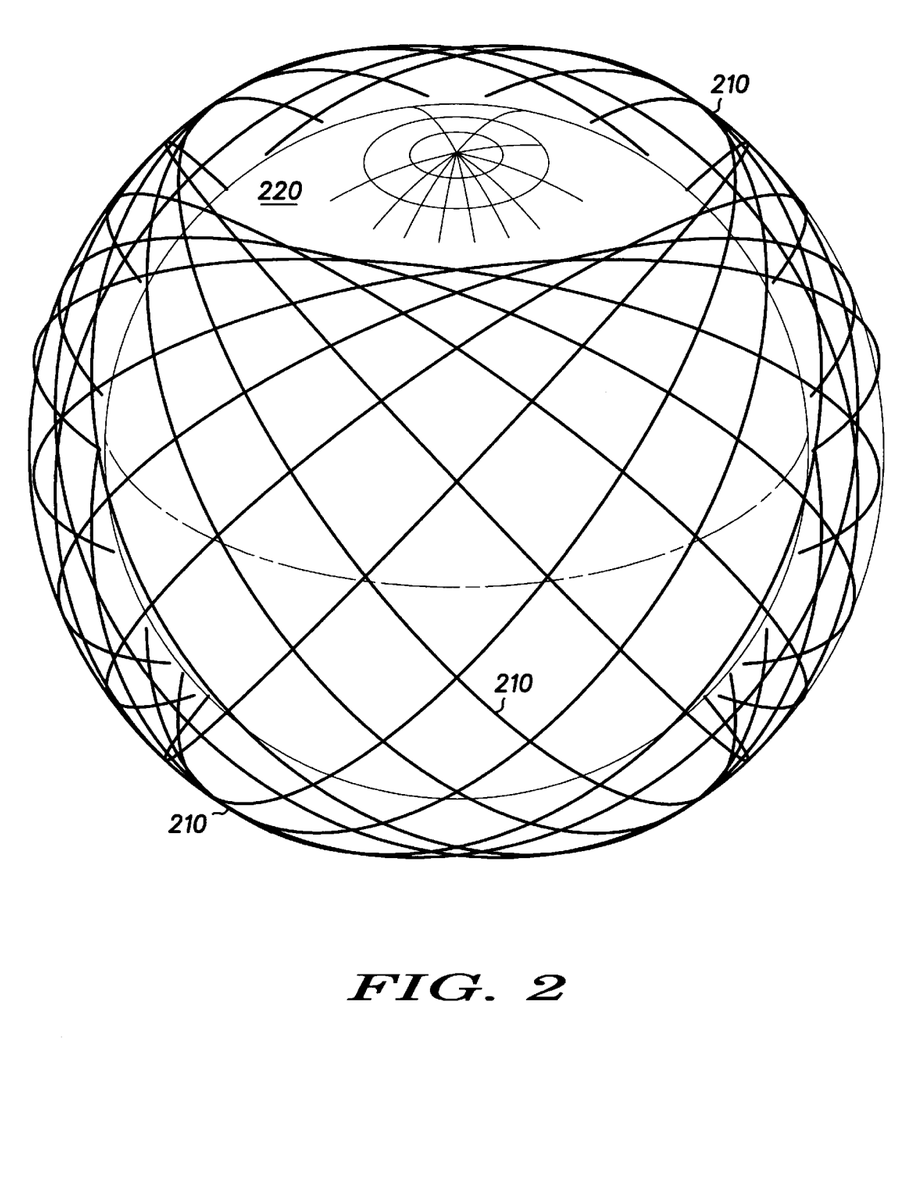
FIG. 2 is a schematic illustration of unpopulated orbital planes of a proposed fully populated satellite constellation which could provide substantially global coverage of the earth.
Figure 3:
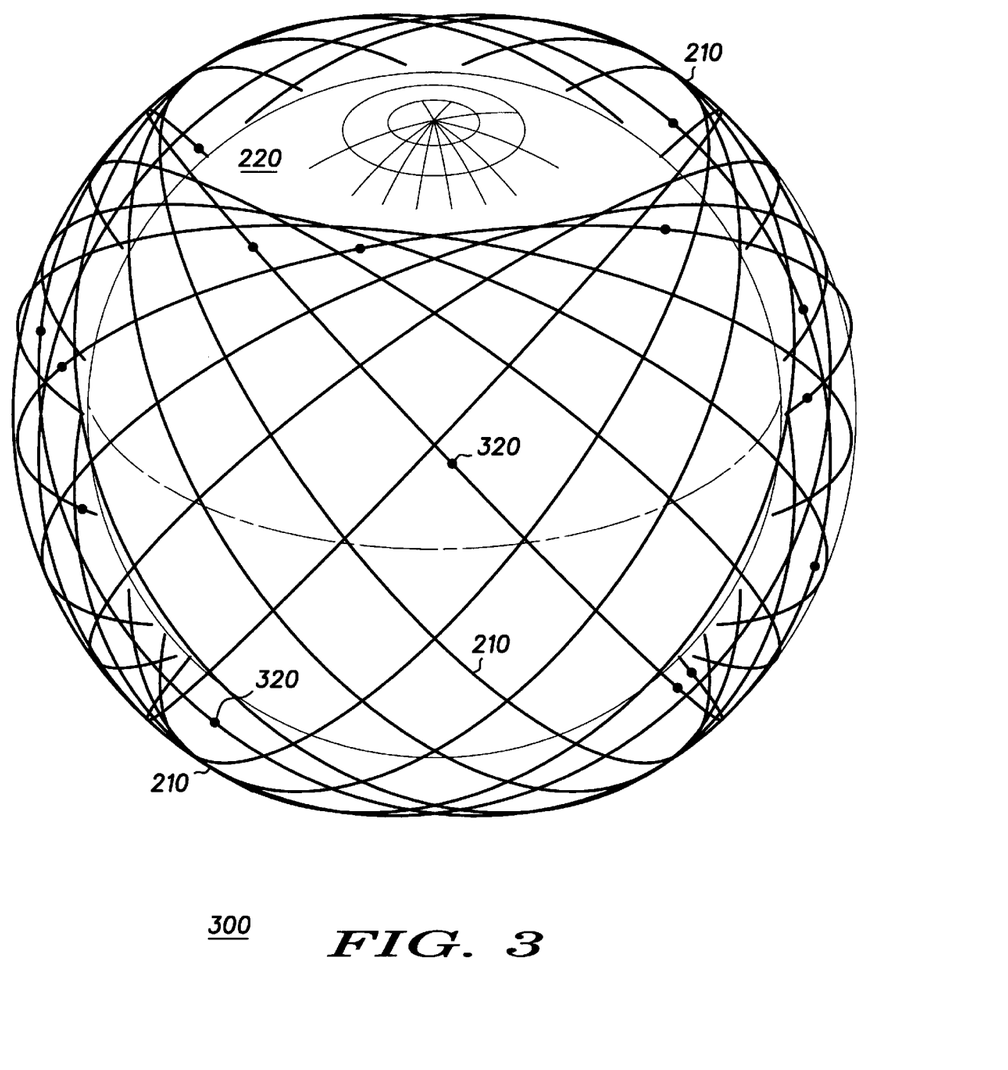
FIG. 3 is a schematic illustration of a partially populated satellite constellation capable of providing service in a first service region in accordance with a preferred embodiment of the present invention.
Figure 4:
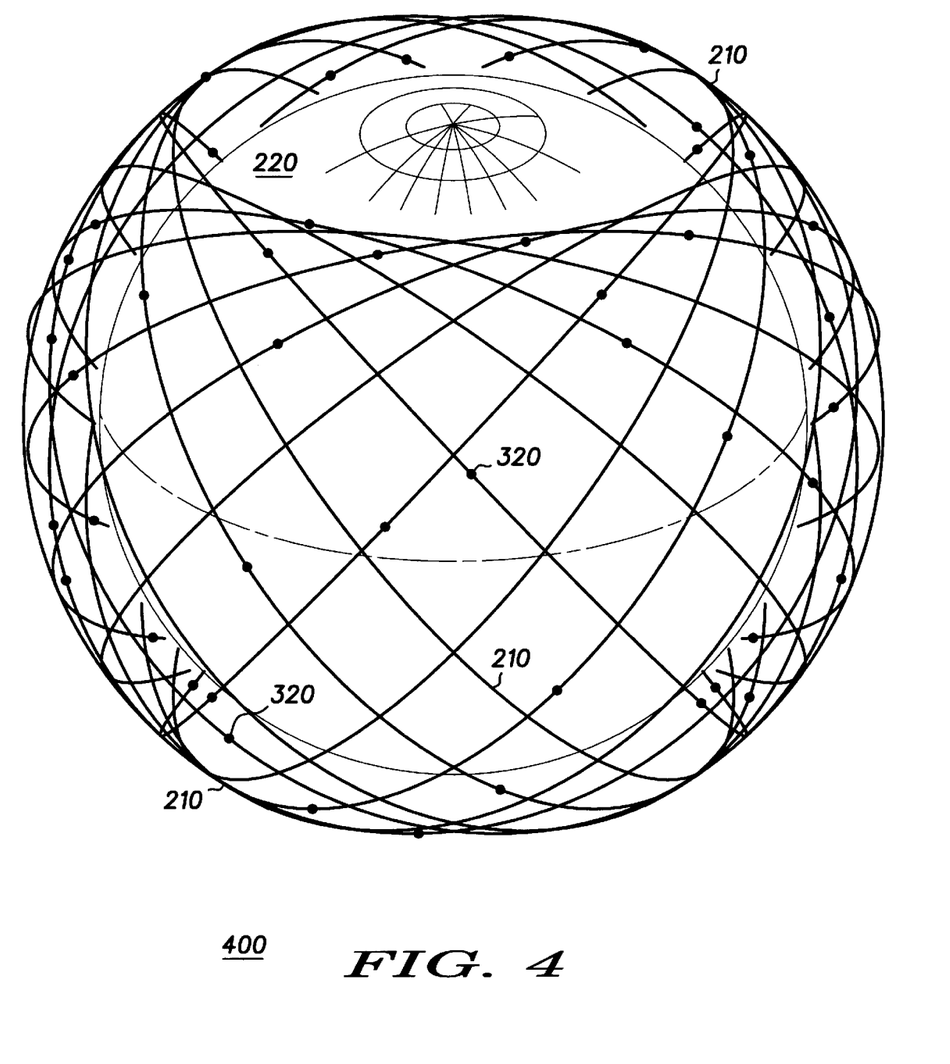
FIG. 4 is a schematic illustration of a partially populated satellite constellation capable of providing service in a second service region in accordance with a preferred embodiment of the present invention.

FIGS. 2–4 represent as an illustrative example of a process of populating orbital planes in accordance with step 120 of method 100. The proposed fully populated satellite constellation selected for discussion in FIGS. 2–4 and 5 was selected by way of illustrative example of but one proposed constellation with which the method of the present invention could be employed, and is not intended to be limiting in any manner. The present invention could be used with any number of various potential satellite constellations having numerous different potential combinations of orbital planes and numbers of satellites in each orbital plane.

FIG. 2 is a schematic illustration of unpopulated orbital planes 210 of a proposed fully populated satellite constellation which could provide substantially global coverage of the earth. The example of a proposed fully populated satellite constellation illustrated FIG. 2 would be comprised of 16 inclined orbital planes 210, surrounding the earth 220. Satellites are not shown in FIG. 2 because no satellites would have yet been deployed. However, the proposed fully populated satellite constellation would have 9 satellites in each of the 16 orbital planes 210 (the proposed fully populated constellation can thus be referred to as a (16×9) constellation). The relatively large size of this constellation permits examining early deployment strategies of one quarter, one half, and all sixteen planes of the proposed fully populated satellite constellation.

FIG. 3 is a schematic illustration of a partially populated satellite constellation capable of providing service in a first service region in accordance with a preferred embodiment of the present invention. In FIG. 3, one quarter of the 16 orbital planes 210, or more specifically, planes 1,5,9, and 13 have been populated with satellites 320 to provide a partially populated satellite constellation 300 to provide a (4×9) partial satellite constellation (i.e. a constellation having 4 orbital planes each containing 9 satellites). The partially populated satellite constellation could be used to provide continuous service in a first service region comprised of a band of latitude between 18° and 56° around the earth at a minimum elevation angle of 14° at an altitude of 1400 km.

FIG. 4 is a schematic illustration of a partially populated satellite constellation capable of providing service in a second service region in accordance with a preferred embodiment of the present invention. In FIG. 4, an (8×9) partially populated satellite constellation 400 is provided using planes 1,3,5,7,9,11,13, and 15 of the proposed fully populated satellite constellation. This partial satellite constellation could be used to provide continuous service from in a second service region comprised of a band of latitude between 0° and 62° around the earth at a minimum elevation angle of 17° at an altitude of 1400 km.

Figure 5:
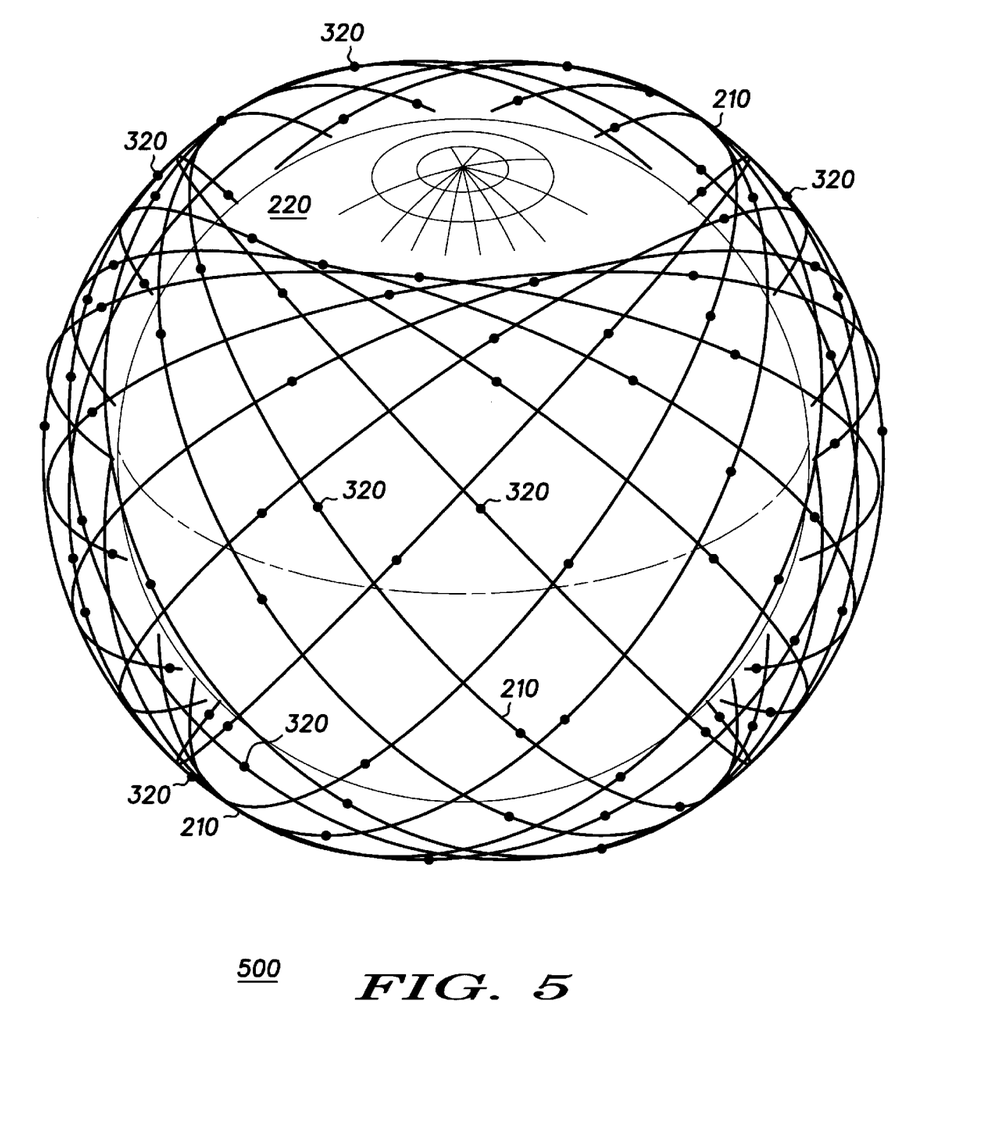
FIG. 5 is a schematic illustration of a fully populated satellite constellation in accordance with a preferred embodiment of the present invention.

FIG. 5 is a schematic illustration of a fully populated satellite constellation in accordance with a preferred embodiment of the present invention. The fully populated satellite constellation 500 is the 16×9 constellation described above. The proposed fully populated satellite constellation would have a design point of a 34° minimum elevation angle at an altitude of 1400 km, which is twice as large as the minimum elevation angle of partially populated satellite constellation 400.

Method 100 also can comprise further steps in addition to steps 110–130 for deploying multiple phases of satellites to populate multiple sets of orbital planes over a period of time. Method 100 also can comprise further steps for providing continuous service through each phase of satellites of the multiple phases to a gradually increasing the service region to which the continuous service can be provided before the proposed fully populated satellite constellation becomes operational. Thus, method 100 could be extended to include steps 140–160 and possibly additional steps for additional phases.

Step 140 comprises deploying a second phase of satellites. For example, with reference to FIGS. 3 and 4 above, using the example of a proposed fully populated 16×9 satellite constellation, assume that 36 satellites have already been deployed and used to populate four orbital planes 1, 5, 9 and 13 as shown in FIG. 4. In step 140 a second phase of satellites comprising 36 additional satellites which could be deployed and used in step 150 to populate four additional planes 3, 7, 11, and 15. The resultant second partially populated satellite constellation (comprised of a combination of the first phase of satellites and the second phase of satellites) could then be used in step 160 to provide continuous service in a second service region or latitude band, which desirably would cover a larger geographic area than the first service region covered by the first partially populated satellite constellation. Generally, the second service region will not be as large (in terms of latitude) as the potential service region to be covered by the proposed fully populated satellite constellation, but it is possible that the second service region (or even the first service region) could approximate the size of the potential service region but have slightly lower quality of service in terms of requiring the use of lower elevation angles and providing lower levels of coverage (e.g. single coverage rather than double or other forms of multiple coverage).

Additional phases of satellites even beyond a first and second phase also could be deployed, populated, and used to provide early service in accordance with the method of the present invention. The service region (or band of latitude) where continuous coverage is provided as well as the quality of service (higher elevation angles) can evolve as the partially populated satellite constellation approaches the parameters of the proposed fully populated satellite constellation.

Moreover, satellites 320 could include the capability to communicate with each other by means of inter-satellite links. These inter-satellite links could be radio frequency (RF) or optical links which can be used to communicate between satellites. These inter-satellite links could be used in one or more phases of deployment to provide communication links between satellites deployed during a particular phase. Preferably, for example, inter-satellite links could be designed with appropriate parameters to allow satellites deployed in a first phase to communicate with satellites deployed in one or more later phases. Additionally, satellites deployed in one or more early phases of deployment could be adapted to communicate between satellites at greater distances from each other, whereas satellites deployed in one or more later phases could be adapted to communicate with other satellites at shorter distances and would not necessarily need to be capable of communicating at the longer distances required in earlier phases, and/or between satellites deployed in one or more phases.

Alternatively, satellites deployed in a first phase of deployment could be designed and/ or programmed to communicate only with satellites deployed in the first phase of deployment. Similarly satellites deployed in second or later phases of deployment could be designed and/or programmed to communicate only with other satellites deployed in the same phase of deployment. In this embodiment, a satellite communication system control device located on the earth or dispersed through one or more other components of the satellite system can direct satellites from the first phase to establish communication with satellites of a second or later phase at a time when the second of later phase of satellites has been fully deployed. Additionally, a network control facility (NCF) could establish communication between two or more communication units using the partial satellite constellation. When multiple phases of the partial satellite constellations have been deployed, the NCF could direct satellites 320 to establish a communications between CUs using only satellites deployed in a particular phase of deployment.

Figure 6:
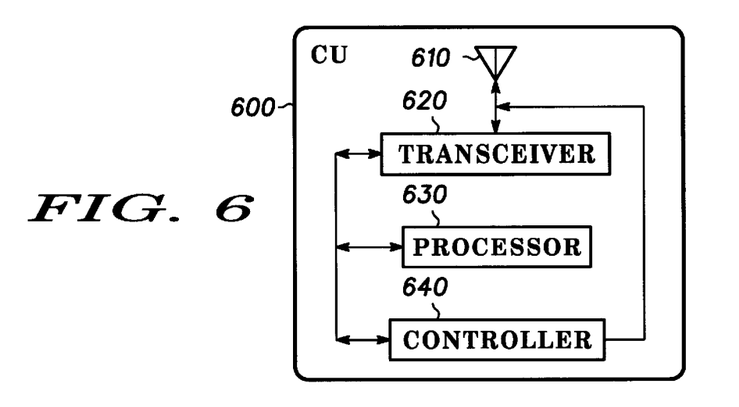
FIG. 6 illustrates a simplified block diagram of a communication unit for communicating in a satellite communication system during a plurality of phases of deployment of a satellite constellation of the satellite communication system in accordance with a preferred embodiment of the present invention.

FIG. 6 illustrates a simplified block diagram of a communication unit (CU) for communicating in a satellite communication system during a plurality of phases of deployment of a satellite constellation of the satellite communication system in accordance with a preferred embodiment of the present invention.

CU 600 preferably is a communication device capable of transmitting data and/or voice to, and receiving data and/or voice from one or more satellites. By way of example, CU 600 could be a computer or other devices capable of sending and receiving data, e-mail messages, video signals or facsimile signals to name a few. CU 600 also could be a relatively stationary terminal located on, near or in a premises or building, such as a house or a place of business, wherein the CU can be configured to receive and/or transmit signals from one or more satellites. CU 600 then could relay the signals in appropriate form to one or more devices in communication with CU 600, such as for example, television telephone, computer, or other similar device. Alternatively, CU 600 could be hand-held cellular telephones adapted to transmit and receive communications from satellites. CU 600 preferably communicates with one or more satellites over a service link (not shown) between CU 600 and one or more satellites.

In the present invention, CU 600 is adapted to communicate in a satellite communication system that is capable of providing continuous service in a first band of latitude at a first minimum elevation angle through a partially populated satellite constellation during a first phase of deployment of a fully populated satellite constellation and also is capable of providing continuous service in a second band of latitude at a second minimum elevation during a second phase of deployment of the fully populated satellite constellation. As noted above with reference to method 100, the minimum elevation angle for communicating with the partially populated satellites constellation could be different than the minimum elevation angle for communicating with second or additional phases of partially populated satellite constellation and of the proposed fully populated satellite constellation.

CU 600 also includes antenna 610. Antenna 610 preferably is a steerable antenna which can be adjusted to communicate with one or more satellites of one or more phases of a partially populated satellite constellation at a first minimum elevation angle during the first phase of deployment and also at the second minimum elevation during the second phase of deployment. Antenna 610 could be, for example, a phased array antenna, or a steerable satellite dish, or some other similar device.

CU 600 also includes transceiver 620 coupled to antenna 610 for communicating with satellites of the satellite communication system through a service link established by a satellite and also for receiving instructions. These instructions could include, for example instructions to adjust antenna 610 to communicate at the second minimum elevation angle during the second phase of deployment. Alternatively, these instructions could include any of numerous other instructions relating to adjustment of system configuration and/or operational parameters, or could include other instructions communicated to CU 600 during a first, second or later phase of deployment. Additionally, because CU 600 is adapted for use in a satellite system which could evolve through multiple phases of deployment, one or more instructions or sets of instructions could be communicated to CU 600 at a first time during a first phase of deployment, and CU 600 could be directed to ignore the instruction or set of instructions sent to CU 600 until a specified time during a later phase of deployment, at which time, CU 600 could be directed to implement the instruction or instruction set to adjust to system configuration or operational parameters of a second or later phase of deployment. Such instructions or sets of instructions could be received from a satellite communication system control device remotely located from CU 600 or could be received from some other component of the satellite communication system such as one or more satellites. The exact nature and source of the instruction to adjust the antenna is not of particular importance in the present invention.

CU 600 also includes a controller 640 coupled to antenna 610. Controller 640 preferably is a device which is capable of adjusting the position of the antenna 610 so that antenna 610 can be properly positioned to communicate with the partially populated satellite constellation at the appropriate minimum elevation angle, which could be substantially lower than the minimum elevation angle of the proposed fully populated satellite constellation and so that antenna 610 later can be adjusted to communicate at different minimum elevation angles required either with second or additional phases of the partially populated satellite constellation, or with the final (fully populated) satellite constellation.

CU 600 also includes a processor 630 for processing the instruction to adjust the position of the steerable antenna and for directing controller 640 to adjust the position of the steerable antenna to communicate with the satellite communication system at the various minimum elevation angles during one or more phases of deployment. For example, processor 630 could direct controller 640 to adjust the antenna from a first position adapted to communicate at a first elevation angle during a first phase of deployment (the first position could, but would not necessarily be setup during installation of the antenna at a specific location if the CU is a relatively stationary CU, such as a CU located on a roof top of a home or place of business) to a second position adapted to communicate at a second minimum elevation angle during a second phase of deployment of the satellite constellation.

Figure 7:
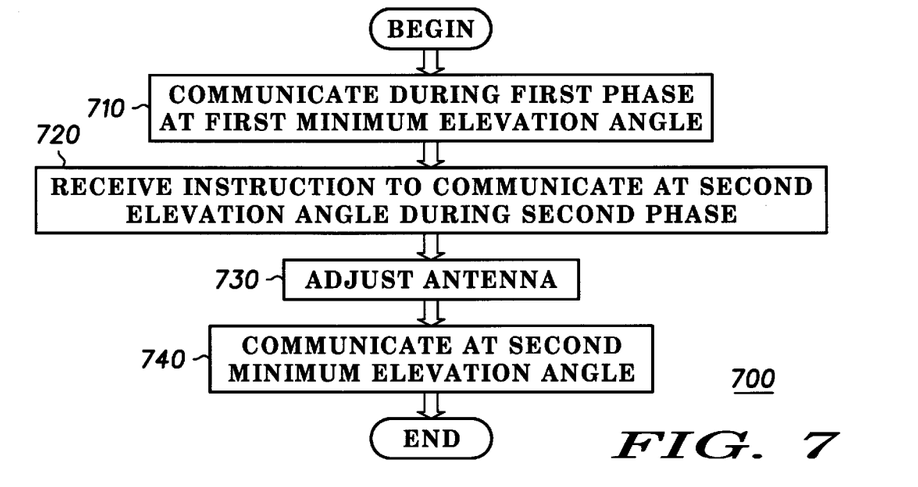
FIG. 7 illustrates a flow chart of a method for a CU to communicate in a satellite communication system during a plurality of phases of deployment of a satellite constellation of the satellite communication system in accordance with a preferred embodiment of the present invention.

FIG. 7 illustrates a flow chart of a method for a communication unit to communicate in a satellite communication system during a plurality of phases of deployment of a satellite constellation of the satellite. Method 700 preferably is employed by a CU, such as CU 600, for determining and providing an appropriate position of a steerable antenna to communicate at one or more minimum elevation angles during various phases of deployment of a partial satellite constellation and ultimately at the design minimum elevation angle of the fully populated satellite constellation.

Method 700 begins in step 710 when the CU is communicating with the satellite communication system (preferably with at least one satellite) during a first phase of deployment of the satellite constellation at a first minimum elevation angle. In step 720, CU receives an instruction to adjust the steerable antenna to communicate with the satellite communication system at a second minimum elevation angle during a second phase of deployment of the satellite constellation This step also could apply to additional phases beyond a second phase of satellite deployment and could also apply when the second (or later phase) of deployment results in the fully populated satellite constellation.

In step 730, the CU then will adjust the steerable antenna to communicate with the satellite communication system at the second minimum elevation angle during the second phase of deployment of the satellite constellation. This step also could apply to additional phases beyond a second phase of satellite deployment and could also apply when the second (or later phase) of deployment results in the fully populated satellite constellation. The CU will then, in step 740, communicate with the satellite communication system at the second (or other) minimum elevation angle during the second (or other) phase of deployment of the satellite constellation.

Satellites 320 also may be adapted to provide service (and/or communicate with earth-based devices, and/or with devices located on or below the surface of the earth or in the atmosphere above the earth) at varying minimum elevation angles during different phases of deployment of the partial satellite constellation (and in the fully populated satellite constellation) in the present invention. Adaptation of satellites to provide service at varying minimum elevation angles could be made in at least one of two ways, and/or through a combination thereof. In a preferred embodiment, one or more satellites of a first phase of satellites would have an antenna which is adapted to provide one or more service beams. Satellites deployed during the first phase would have antennas which would be capable of providing a relatively large beam or beams to provide a relatively large satellite footprint (or area of coverage) on the surface of the earth. Such satellites would be capable of providing service at a relatively low minimum elevation angle. Satellites deployed during a second or later phase of deployment then could be equipped with antennas which would not need to provide as large of beam or beams or as of large satellite footprint (or area of coverage) as provided by satellites deployed in the first phase. Thus, increasingly less complex and/or less expensive satellites could be used in second or later phases.

Alternatively, satellites 320 could have antennas which could be adapted to provide relatively large service beams and accompanying satellite footprints in early phases of deployment, such as the first phase of deployment and could then be adapted to provide service beams and accompanying satellite footprints of relative decreasing size during later phases of deployment. Thus could be accomplished through use of an antenna apparatus such as antenna apparatus 800 of FIG. 8.

Figure 8:
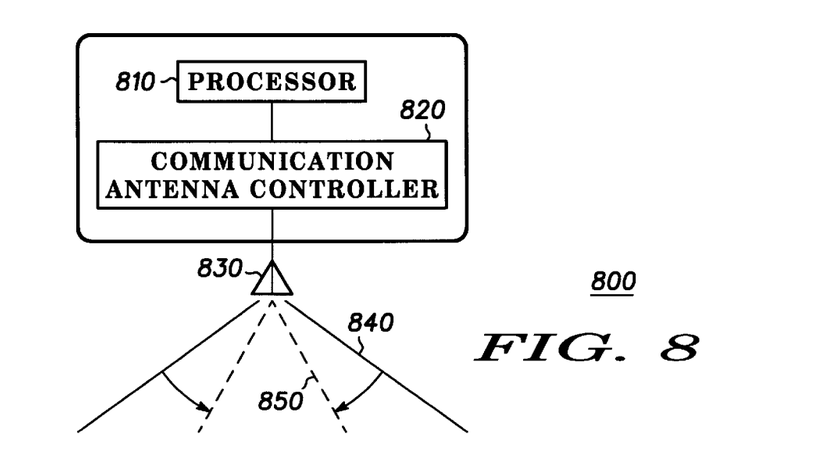
FIG. 8 illustrates a simplified block diagram of an satellite antenna apparatus in accordance with a preferred embodiment of the present invention.

FIG. 8 illustrates a simplified block diagram of an antenna apparatus in accordance with a preferred embodiment of the present invention. In a preferred embodiment, communication antenna apparatus 800 resides on board a satellite. Communication antenna apparatus includes processor 810 and at least one antenna element 820. Antenna element 820 is capable of providing a service beam 840 which is relatively large and which would project a relatively large satellite footprint on the earth during a first phase of deployment. Antenna element 820 is also capable of being adapted to provide a relatively smaller service beam, such as service beam 850 during a second or later phase of deployment. Processor 810 could determine the size of the satellite footprint needed to provide service at a particular minimum elevation angle and then determine the accompanying beam size needed to produce the desired satellite footprint. Processor 810 could then communicate this information to communication antenna controller 820, which could make appropriate adjustments in antenna element 830.

In summary, the present invention provides a method for providing continuous service from a partially populated satellite constellation wherein the partially populated satellite constellation comprises a portion of a proposed fully populated satellite constellation which is in the process of being, but is not yet, fully populated. One or more phases of satellites can be positioned in one or more sets of orbital planes such that each satellite residing in each orbital plane resides in a first position which is substantially the same as a position in which each satellite will reside in the fully populated satellite constellation such that the plurality of satellites will not need to be relocated from the first position to a second position in the fully populated satellite constellation. Also, provided is a communication unit (600) for communicating in a satellite communication system having a satellite constellation capable of being deployed in a plurality of phases of deployment and capable of providing continuous communication services during one or more phases of the plurality of phases of deployment is provided. The communication unit is capable of communicating with the satellite communication system at various minimum elevation angles during various phases of deployment. Additionally, a satellite antenna apparatus (800) adapted for providing satellite service at various minimum elevation angles during various phases of deployment also is provided.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

While the present invention has been described above in connection with a specific method and apparatus and with reference to a preferred embodiment, it is to be clearly understood that this description is made only by way of example and not as a limitation on the scope of the invention. Those skilled in the art will recognize that changes and modification could be made in the preferred embodiment without departing from the scope of the present invention. For example, those skilled in the art will recognize that, although methods 100 and 700 have been described with reference to a satellite constellation deployed, dispersed over and orbiting the earth 220, a satellite system could be deployed, dispersed over, and orbit any celestial body without departing from the scope of the present invention.

Furthermore, although the satellite system of the present invention was described with reference to an exemplary embodiment referring to a satellite constellation containing a specified number of satellites in a specified number of orbital planes portrayed as inclined orbital planes, the method and apparatus of the present invention could be practiced using satellite constellations of virtually any composition in terms of numbers and types of satellites (e.g. LEOs and/or MEOs and/or other NGSOs and/or combinations thereof) and could be used in constellations having polar or inclined orbital planes.

Moreover, although the present invention was described primarily with reference to a satellite system used for telecommunication-type applications, the specific type of service provided by the satellite constellation and/or satellite system is not critical to the present invention, and the present invention could be applicable to virtually any type of satellite system providing any one or more of various types of services including not only communication services, but also including, for example, remote sensing, resource mapping, navigation, information services, and numerous other potential satellite services without departing from the spirit of the present invention.

These and other modifications that are obvious to those skilled in the art are intended to be included in the scope of the present invention.

We claim:

1. A method for providing continuous communication service from a portion of a satellite communication system having a satellite constellation which is not yet fully populated, the satellite constellation having a number of total orbital planes, wherein the satellite constellation has an optimal plane phasing value, the method comprising:

a) deploying a first phase of satellites over a first period of time;

b) creating a partially populated satellite constellation by populating a first subset of orbital planes of the satellite constellation with the first phase of satellites, wherein the first subset of orbital planes populated by the first phase of satellites comprises less orbital planes than the number of total orbital planes of the satellite constellation; and c) using the partially populated satellite constellation to provide continuous communication service to one or more communication units within a first service region of the satellite communication system, wherein the satellites of the first phase of satellites are placed in the first subset of orbital planes in the partially populated satellite constellation permitting additional satellites to be added to the orbital planes to fully populate the satellite constellation without substantially relocating the satellites of the partially populated satellite constellation.

2. The method as claimed in claim 1, wherein step (b) comprises populating the first subset of orbital planes with the first phase of satellites such that each orbital plane of the first subset of orbital planes contains a number of satellites which is substantially the same as the number of satellites that will reside in the subset of orbital planes in the satellite constellation when it is fully populated.

3. The method as claimed in claim 1, wherein in step b), the first phase of satellites are positioned in the subset of orbital planes such that the satellites reside in a first position which is substantially the same as a final position in which the satellites will reside in the satellite constellation when it is fully populated.

4. The method as claimed in claim 1, wherein the first service region comprises a predetermined band of latitude.

5. The method as claimed in claim 4, wherein the predetermined band of latitude corresponds to a smaller geographic region than a geographic region to receive service from the satellite constellation when it is fully populated.

6. The method as claimed in claim 1, wherein the first service region comprises one or more geographic locations in which service is provided during one or more periods of time each day.

7. The method as claimed in claim 1, wherein step (b) comprises populating the first subset of orbital planes with the first phase of satellites such that the first subset of orbital planes will have a relative plane phasing value which is consistent with the optimal plane phasing value of the satellite constellation.

8. The method as claimed in claim 1, wherein the partially populated satellite constellation comprises a number of orbital planes which is approximately one quarter of the number of total orbital planes of the satellite constellation.

9. The method as claimed in claim 1, wherein the partially populated satellite constellation comprises a number of orbital planes which is approximately one half of the number of total orbital planes of the satellite constellation.

10. The method as claimed in claim 1, further comprising the steps of:
   d) deploying a second phase of satellites over a second period of time;
   e) populating a second subset of orbital planes with the second phase of satellites, wherein the second subset of orbital planes comprises less orbital planes than the number of total orbital planes of the satellite constellation; and
   f) using the satellites of the second subset to provide continuous service to one or more devices within a second service region of the satellite communication system.

11. The method as claimed in claim 10, wherein step (f) comprises the step of providing continuous service to one or more communication devices within a second service region through a combination of the first phase of satellites and the second phase of satellites.

12. The method as claimed in claim 10, wherein one or more satellites of the first phase of satellites is adapted to provide one or more service beams having a first beam width and one or more satellites of the second phase of satellites is adapted to provide one or more service beams having a second beam width.

13. The method as claimed in claim 12, wherein the first beam width is wider than the second beam width, and wherein the one or more service beams having a first beam width are capable of providing a larger satellite footprint than the one or more service beams having a second beam width.

14. The method as claimed in claim 10, further comprising the step of:
   (g) combining the first phase of satellites and the second phase of to provide a fully populated satellite constellation, wherein the fully populated satellite constellation has a relative plane phasing value which is consistent with the optimal plane phasing value.

15. The method as claimed in claim 1, wherein in step (c) the first phase of satellites providing multiple coverage, through which more than one satellite communicates with a first communication unit at the same time in the first service region.

16. A method for providing continuous service in a service region comprising a portion of a service area of a satellite constellation, wherein the satellite constellation, when fully populated with satellites, has n total number of orbital planes each having m satellites residing therein, the method comprising the steps of:
   a) creating a partially populated satellite constellation by deploying a first phase of satellites over a first time and positioning the first phase of satellites, in x orbital planes of the n total number of orbital planes of the satellite constellation wherein x is less than n and wherein each orbital plane of the x orbital planes contains at least m satellites; and
   b) providing continuous service to the service region through the partial satellite constellation, wherein each of the x orbital planes is populated with m satellites each residing in a position in the x orbital planes which is substantially the same as a position in which the m satellites will reside in the satellite constellation when it is fully populated.

17. The method as claimed in claim 16, wherein x is less than or equal to n and wherein each orbital plane of the x orbital planes contains fewer than m satellites.

18. The method as claimed in claim 16, wherein the portion of the potential service area comprises a predetermined band of latitude.

19. The method as claimed in claim 16, wherein step a) further comprises the step of populating the partially populated satellite constellation such that each orbital plane of the n total number of orbital planes has a relative plane phasing value which is consistent with an optimal plane phasing value of the satellite constellation when fully populated.

20. The method as claimed in claim 16, wherein x has a numeric value approximately equal to one quarter of a numeric value of n.

21. The method as claimed in claim 16, wherein x has a numeric value approximately equal to one half of a numeric value of n.

22. A method for a communication unit to communicate in a satellite system having a satellite constellation capable of being deployed in a plurality of phases of deployment and for providing continuous communication services during one or more phases of the plurality of phases of deployment, the communication unit having a steerable antenna, the method comprising the steps of:
   a) communicating with the satellite communication system during a first phase of deployment of the satellite constellation at a first minimum elevation angle; and
   b) receiving in the communication unit an instruction to adjust the steerable antenna of the communication unit to communicate with the satellite communication system at a second minimum elevation angle during a second phase of deployment of the satellite constellation.

23. The method as claimed in claim 22, further comprising the steps of:
   c) adjusting the steerable antenna to communicate with the satellite communication system at the second minimum elevation angle during the second phase of deployment of the satellite constellation; and
   d) communicating with the satellite communication system at the second minimum elevation angle during the second phase of deployment of the satellite constellation.

24. A communication unit for use in a satellite communication system, wherein the satellite communication system provides continuous service in a first band of latitude at a first minimum elevation angle through a partially populated satellite constellation during a first phase of deployment of a fully populated satellite constellation and provides continuous service in a second band of latitude at a second minimum elevation angle during a second phase of deployment of the fully populated satellite constellation, the communication unit comprising:
   a steerable antenna for communicating with one or more satellites of the partially populated satellite constellation at the first minimum elevation angle during the first phase of deployment at the second minimum elevation during the second phase of deployment;
   a controller coupled to the steerable antenna for adjusting a position of the steerable antenna;
   a transceiver coupled to the steerable antenna for communicating with the satellite communication system through a service link and for receiving an instruction to adjust the steerable antenna to communicate at the second minimum elevation angle during the second phase of deployment; and
   a processor for processing the instruction and for directing the controller to adjust the position of the steerable antenna of the communication unit to communicate with the satellite communication system at the second minimum elevation angle during the second phase of deployment of the satellite constellation.

25. The communication unit as claimed in claim 24, wherein the steerable antenna is a phased array antenna.

26. The communication unit as claimed in claim 24, wherein the steerable antenna is a satellite dish.

27. An antenna apparatus for use in a satellite of a satellite system for providing service during one or more phases of deployment, wherein one or more satellites of a first phase of deployment will provide service at a first minimum elevation angle and wherein one or more satellites of a second or later phase of deployment will provide service at a second elevation angle, the antenna apparatus comprising:

one or more antenna elements for providing one or more service beams of varying size, wherein each service beam projects a satellite footprint on the surface of the earth;

an antenna controller coupled to the one or more antenna elements for controlling the one or more antenna element and adjusting a size of the one or more service beams; and     a processor for determining an appropriate size of a first service beam to be provided by the one or more antenna elements during the first phase of deployment and of a second service beam to be provided during the second or later phase of deployment and for directing the antenna controller to adjust the antenna elements to provide the appropriate size of service beam.

28. A method for providing continuous communication service from a portion of a satellite system having a satellite constellation to be deployed in a plurality of phases of deployment and for providing continuous communication services during one or more phases of the plurality of phases of deployment, the satellite constellation comprising a number of total orbital planes, the method comprising the steps of:

a) deploying one or more phases of satellites over a first period of time;

b) populating a first subset of orbital planes of the satellite constellation with the satellites of the one or more phases of satellites, wherein the first subset of orbital planes populated by the one or more phases of satellites deployed over the first period of time comprises less orbital planes than the number of total orbital planes of the satellite constellation;

c) deploying one or more phases of satellites over a second period of time;

d) populating a second subset of orbital planes of the satellite constellation with the one or more phases of satellites deployed over the second period of time, wherein the first subset of orbital planes comprises less orbital planes than the number of total orbital planes of the satellite constellation;

e) providing in the satellites deployed in the first period of time and the second period of time means for communicating between the satellites using inter-satellite links; and     f) directing the satellites to use the inter-satellite links to communicate only between satellites deployed in a specified phase of said one or more phases.

29. The method as claimed in claim 28, wherein step (f) comprises the step of:

directing the satellites to use the inter-satellite links of the satellites deployed in a first phase of deployment to communicate only with other satellites deployed in the first phase and not with satellites deployed in a second phase of deployment.

30. The method as claimed in claim 28, wherein step (f) comprises the step of:

directing the satellites to use the inter-satellite links of the satellites deployed in a first phase of deployment to communicate with other satellites deployed in one or more later phases of deployment.

31. The method as claimed in claim 28, wherein step (f) comprises the step of:

directing the satellites to use the inter-satellite links of the satellites deployed in a first phase of deployment to communicate with other satellites deployed in one or more later phases of deployment.

32. The method as claimed in claim 31, wherein a set of satellites deployed in the first phase of deployment communicate with other satellites using the inter-satellite link at greater distances than a set of satellites deployed in a later phase of deployment are adapted to communicate using the inter-satellite links.

* * * * *